United States Patent [19]

Kitazume et al.

[11] Patent Number: 4,885,185
[45] Date of Patent: Dec. 5, 1989

[54] METHOD OF MAKING SOYBEAN MILK

[75] Inventors: Kiyoshi Kitazume; Yasuharu Nakamura, both of Chiba; Hiromichi Ochiai, Tokyo; Hisashi Nozaki, Saitama, all of Japan

[73] Assignee: Kabushikikaisha Kibun, Tokyo, Japan

[21] Appl. No.: 305,980

[22] Filed: Feb. 3, 1989

Related U.S. Application Data

[63] Continuation of Ser. No. 908,619, Sep. 10, 1986, abandoned.

[30] Foreign Application Priority Data

Sep. 21, 1985 [JP] Japan ................................. 60-207763

[51] Int. Cl.$^4$ ................................................ A23L 1/20
[52] U.S. Cl. ..................................... 426/598; 426/634
[58] Field of Search ................... 426/801, 580, 330.3, 426/330, 629, 634, 654, 598

[56] References Cited

U.S. PATENT DOCUMENTS

| | | | |
|---|---|---|---|
| 3,288,614 | 11/1966 | Miles | 426/311 |
| 3,386,833 | 6/1968 | Johnson | 426/654 |
| 3,399,997 | 9/1968 | Okumura | 426/311 |
| 3,635,728 | 1/1972 | Rockland | 426/327 |
| 3,639,129 | 2/1972 | Mustakas | 426/471 |
| 3,901,978 | 8/1975 | Nelson | 426/656 |
| 4,000,326 | 12/1976 | Okada et al. | . |
| 4,369,198 | 1/1983 | Uchi | 426/271 |
| 4,409,256 | 10/1983 | Johnson et al. | 426/598 |

FOREIGN PATENT DOCUMENTS 518706 10/1981 Australia .
28633 10/1980 Japan .
2168592 6/1986 United Kingdom .

Primary Examiner—Carolyn Paden
Attorney, Agent, or Firm—Browdy and Neimark

[57] ABSTRACT

Soybean milk from which grassy-smell and trypsin inhibitor have substantially been eliminated is prepared by crushing soybean at a temperature of 85° C. or higher, maintaining the resulting crushed slurry at an elevated temperature, grinding the slurry, removing bean-curd (tofu) refuse from the slurry, and sterilizing the resulting soybean milk in a plate-type sterilizer.

4 Claims, No Drawings

METHOD OF MAKING SOYBEAN MILK

This application is a continuation of application Ser. No. 908,619, filed Sept. 10, 1986, now abandoned.

FIELD OF THE INVENTION

The present invention relates to a method of preparing soybean milk from which the grassy-smell characteristic of soybean and trypsin inhibitor have been eliminated substantially.

BACKGROUND OF THE INVENTION

In the preparation of soybean milk, great efforts have hitherto been made to deactivate lipoxydase, i.e., an enzyme producing the grassy-smell of soybean which is recognized once soybean milk is drunk.

On the other hand, soybean contains a substantial amount of trypsin inhibitor. This enzyme trypsin inhibitor, which is difficult to deactivate by heating, will inhibit the activity of trypsin, i.e., a digestive enzyme to be secreted in the stomach, so that indigestion or diarrhea may thereby be caused.

SUMMARY OF THE INVENTION

The present inventors have studied for the purpose of deactivating trypsin inhibitor in soybean milk while preventing the grassy-smell of soybean from being produced, and have now succeeded in deactivating substantially trypsin inhibitor by crushing soybean at a temperature of 85° C. or higher where grassy-smell is not produced, maintaining the resulting crushed slurry at an elevated temperature, grinding the slurry, removing bean-curd (tofu) refuse from the slurry, and sterilizing the resulting soybean milk in a plate-type sterilizer.

DETAILED DESCRIPTION OF THE INVENTION

Aqueous media which may be used in the present invention include water, 0.05–1.0% aqueous solutions of sodium bicarbonate, aqueous phosphate solutions, and the like. Such aqueous media will hereinafter be referred to simply as water.

According to the present invention, soybean is crushed in hot water. Such crushing should be distinguished from so-called grinding or milling. Preferably, crushed soybean comprises square pieces having a size in the order of about 0.2 to 2.0 mm, more preferably from 0.5 to 1.0 mm. Although the size of crushed soybean may fall within a wider range, any appropriate apparatus for crushing soybean in hot water can be chosen, depending on the size of crushed soybean to be desired.

In the present invention, whole soybean, shell-peeled soybean or such soybean impregnated with water is first crushed at a temperature of 85° C. or higher, and then maintained at an elevated temperature for a period of time enough to prevent singly the production of grassy-smell, that is, to substantially deactivate lipoxydase.

Lipoxydase will be deactivated by thus crushing soybean at 85° C. or higher temperatures and maintaining it at elevated temperatures. Such an elevated temperature at which the crushed soybean is maintained includes any temperature sufficient to deactivate lipoxydase and may preferably be 85° C. or higher.

The crushed slurry in which lipoxydase has been deactivated is then ground in a mill. After removing bean-curd (tofu) refuse from the ground slurry, trypsin inhibitor is deactivated by using a plate-type sterilizer, which has generally been used in the sterilization of drinks, without utilizing any special heating apparatus or any deactivator. Thus, inhibitions of the activity of trypsin on drinking soybean milk is substantially eliminated.

In the conventional preparation of soybean milk, deodorization has been performed by heating soybean to substantially deactivate lipoxydase and trypsin inhibitor followed by grinding; or prevention of grassy-smell and deactivation of trypsin inhibitor have been carried out by further heating crushed soybean slurry which had been obtained by grinding soybean in hot water of high temperatures. However, although the deactivation of enzymes is effectively attained by thoroughly heating in the preparation of soybean milk, thermal denaturation of useful proteins may also be caused, resulting in a significant reduction of the extraction rate of soybean proteins. Thus, in certain cases only 50–60% of the soybean proteins may be utilized.

According to the outstanding features of the present invention, the production of grassy-smell which occurs immediately on crushing of soybean is prevented by crushing soybean in hot water at a relatively low temperature of about 85° to 90° C. and maintaining the crushed soybean at the same temperature for a period of time in the range of from 30 seconds to 2 minutes, while on the other hand the deactivation of trypsin inhibitor is carried out in a plate-type sterilizer simultaneously with sterilization. Thus, trypsin inhibitor is substantially deactivated while the production of grassy-smell is prevented, resulting in an increase of the extraction rate of soybean proteins.

Raw materials which may be used in the present invention include whole soybean and shell-peeled soybean, but degreased soybean cannot be used in the present invention. Also included herein such soybean impregnated with water.

In the first step of the method according to the present invention, such raw material soybean is crushed at a temperature of 85° C. or higher. Hot water of 95°–100° C. is continuously fed to a crusher together with the raw material so that the soybean is crushed at 85° C. or higher temperatures. If necessary, steam can be blown into the crusher together with the feeding of hot water to prevent decrease of the temperature.

The crushed slurry is continuously transported to a holder tube or vessel having a certain volume and remains therein for a period of 30 seconds to 2 minutes. More specifically, the holder may be composed of a number of interconnected tubes so as to insure a certain volume therein, so that the passage of the slurry through the holder from its inlet to its outlet will require some time enough to maintain the slurry at an elevated temperature for a certain period of time. Thus, the continuously transported slurry is held in the holder tube at 85° C. or higher, preferably 85° to 90° C., for a period of from 30 seconds to 2 minutes.

The slurry is then ground in a grinder or mill into pieces of smaller sizes. Thus, the slurry is treated so that soybean proteins will be extracted more easily. The ground slurry is then subjected to decantation or vibrating screen to separate bean-curd (tofu) refuse therefrom.

The thus treated soybean milk will be drinkable as it is, although sugar, salt, oil or fat, or the like may be added to season.

The soybean milk is then heated indirectly. The heating must be any one of indirect heating methods which can deactivate trypsin inhibitor and include plate-type and tubular-type methods. Plate-type sterilizers are preferred.

The soybean milk free of bean-curd refuse has no grassy-smell but trypsin inhibitor remains therein in a quantity of about 20 TIU/mg of protein. Therefore, such soybean milk is not suitable for drinking.

In the present invention, however, trypsin inhibitor in the soybean milk having been sterilized in an indirect sterilizer is only about 8 TIU per mg of protein while of course such milk has no grassy-smell. Thus, no indigestion may be caused on drinking this milk, and accordingly, the soybean milk is suitable for drinking.

In addition, since the period of maintaining the slurry after crushing is relatively short according to the present invention, the extraction rate of soybean proteins is 60 to 70% or more which is significantly higher than those values attained by conventional methods, including, for example, deactivation of enzymes by heating followed by grinding, or deactivation of trypsin inhibitor by heating the ground slurry.

The present invention will be further illustrated by the following experimentation and example.

EXPERIMENTATION

Into a crusher, 1 kg of whole soybean was added while hot water of 98° C. was simultaneously poured. Thus, soybean was crushed to obtain a hot slurry of crushed soybean. Thus slurry was introduced into a holder tube to maintain it at 85° C. for 2 minutes, and ground to obtain a soybean slurry, from which bean-curd refuse was then separated by a decanter.

For comparison, as in the above procedures, 1 kg of whole soybean was crushed while adding the soybean together with hot water of 98° C. to a crusher and simultaneously blowing steam thereinto, and a hot slurry of crushed soybean at 95° C. was obtained. The slurry was introduced into another heat reserving vessel and maintained at 95° C. for 2 or 5 minutes. After grinding the slurry, bean-curd refuse was removed off by a decanter.

The soybean milk was adjusted to a protein content of 36% and sterilized in a plate-type sterilizer at 137° C. for 4 seconds. The soybean milk for comparison was sterilized in a direct sterilizer which had been used to sterilize soybean milk.

The soybean milk was totally recovered, and extraction rates of soybean proteins and trypsin inhibitor activities were measured. The results are shown in Table 1.

As seen from Table, the soybean milk prepared according to the present invention showed a higher extraction rate of proteins and had less trypsin inhibitor. Thus, the soybean milk of the present invention is excellent.

TABLE 1

|  | Grassy-smell | Extraction Rate of Proteins | Trypsin Inhibitor in Soybean Milk, TIU/mg protein |
|---|---|---|---|
| Present Invention | No | 73% | 7 |
| Comparison |  |  |  |
| 2 min. holding | No | 68% | 18 |

TABLE 1-continued

|  | Grassy-smell | Extraction Rate of Proteins | Trypsin Inhibitor in Soybean Milk, TIU/mg protein |
|---|---|---|---|
| 5 min. holding | No | 53% | 8 |

EXAMPLE

Five kilograms of whole soybean was crushed while adding hot water of 100° C. The crushed soybean was introduced into a holder tube which has a holding volume corresponding to a passage time of 2 minutes. After maintaining at 85° C. or higher for 2 minutes, the slurry was ground, and bean-curd refuse was continuously separated therefrom by a decanter. To the resulting soybean milk, 1.5% of sugar, 0.1% of salt and 1% of soybean oil were added to season. The seasoned soybean milk was sterilized in a plate-type sterilizer at 137° C. for 4 seconds. The sterilized soybean milk contained remaining trypsin inhibitor in an amount of 7 TIU/mg of protein.

What is claimed is:

1. In a process for preparing soybean milk comprising grinding soybeans in a hot aqueous medium and removing bean-curd refuse, the improvement wherein comprising:

crushing at 85°-90° C. in an aqueous medium, soybeans having significant amounts of active lipoxidase and active trypsin inhibiting enzyme therein, into square pieces having a size in the order of 0.2 to 2.0 mm in an aqueous medium and substantially deactivating said active lipoxidase by maintaining the resulting crushed slurry at 85° to 90° C. for between 30 seconds and 2 minutes without substantially deactivating said active trypsin inhibiting enzyme, extracting soybean protein by grinding the slurry containing said significant amount of said trypsin inhibiting enzyme, removing bean-curd refuse from the slurry, and substantially deactivating said active trypsin inhibiting enzyme by sterilizing the resulting soybean milk by indirect heating.

2. The method of claim 1, wherein the indirect heating is effected by plate-type sterilizer.

3. The method of claim 1, further comprising impregnating said soybeans with water prior to crushing.

4. In a process for preparing soybean milk comprising grinding soybeans in a hot aqueous medium and removing bean-curd refuse, the improvement wherein comprising:

crushing at 85°-90° C. in an aqueous medium, soybeans having significant amounts of active lipoxidase and active trypsin inhibiting enzyme therein, into square pieces having a size in the order of 0.2 to 2.0 mm in an aqueous medium;

maintaining the resulting crushed slurry at 85°-90° C. for between 30 seconds and 2 minutes to deactivate said active lipoxidase without substantially deactivating said active trypsin inhibiting enzyme;

grinding the slurry containing said significant amount of said trypsin inhibiting enzyme under conditions sufficient to increase protein extraction from about 50%, which is obtained when soybeans are ground to a size not greater than 0.1 mm and heated at 95°-98° C. for 240 seconds or more, to about 70%;

removing bean-curd refuse from the slurry; and sterilizing the resulting soybean milk by indirect heating to substantially deactivate said active trypsin inhibiting enzyme.

* * * * *